US012600299B2

(12) United States Patent
Niwa et al.

(10) Patent No.: US 12,600,299 B2
(45) Date of Patent: Apr. 14, 2026

(54) VEHICLE DRIVE ASSIST APPARATUS

(71) Applicant: SUBARU CORPORATION, Tokyo (JP)

(72) Inventors: Hitoshi Niwa, Tokyo (JP); Kentaro Nozu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 35 days.

(21) Appl. No.: 18/768,248

(22) Filed: Jul. 10, 2024

(65) Prior Publication Data

US 2025/0026266 A1      Jan. 23, 2025

(30) Foreign Application Priority Data

Jul. 20, 2023      (JP) ................................. 2023-118180

(51) Int. Cl.
| | |
|---|---|
| *B60Q 9/00* | (2006.01) |
| *G06V 20/58* | (2022.01) |
| *G06V 20/59* | (2022.01) |
| *G07C 5/02* | (2006.01) |

(52) U.S. Cl.
CPC ............. *B60Q 9/008* (2013.01); *G06V 20/58* (2022.01); *G06V 20/597* (2022.01); *G07C 5/02* (2013.01)

(58) Field of Classification Search
CPC ...... B60Q 9/008; G06V 20/58; G06V 20/597; G07C 5/02
See application file for complete search history.

(56) References Cited

U.S. PATENT DOCUMENTS

| | | | | |
|---|---|---|---|---|
| 11,661,075 B2 * | 5/2023 | Julian | .................... | G08B 21/06 |
| | | | | 340/439 |
| 2012/0242819 A1 * | 9/2012 | Schamp | ............... | G06V 20/597 |
| | | | | 348/78 |
| 2016/0326912 A1 * | 11/2016 | Abi-Rached | ............ | F01K 13/02 |
| 2019/0232931 A1 * | 8/2019 | Heckmann | ............ | B60W 50/10 |
| 2019/0381937 A1 * | 12/2019 | Rakshit | .................. | G06V 20/20 |
| 2021/0188289 A1 * | 6/2021 | Oba | ......................... | G08G 1/16 |
| 2022/0121867 A1 * | 4/2022 | Arar | ..................... | G06V 10/454 |

FOREIGN PATENT DOCUMENTS

| | | |
|---|---|---|
| JP | 2012-234409 A | 11/2012 |
| JP | 2013-171389 A | 9/2013 |

* cited by examiner

*Primary Examiner* — Mohamed Barakat
(74) *Attorney, Agent, or Firm* — Rimon P.C.

(57)      ABSTRACT

A vehicle drive assist apparatus for a vehicle includes: a forward environment recognition device configured to acquire forward environment information of the vehicle; a lateral environment recognition device configured to acquire lateral environment information of the vehicle; an alarm device configured to alert a driver who drives the vehicle through at least an alarm or a warning display; and a control unit configured to receive surrounding environment information including the forward environment information and the lateral environment information and activate the alarm device. The control unit is configured to compute a cognitive load value of the driver based on an object detected within a cognitive field-of-view area of the driver extracted from the surrounding environment information, and, in accordance with the cognitive load value, variably set a warning level of the alarm device to be activated upon detection of a potential collision object in the lateral environment information.

7 Claims, 6 Drawing Sheets

FIG. 5

| SMALL BASE LOAD VALUE (A_1) | MODERATE BASE LOAD VALUE (A_2) | LARGE BASE LOAD VALUE (A_3) |
|---|---|---|
| STATIC OBJECTS SUCH AS SIGNS | STATIC OBJECTS RELATED TO ROAD TRAFFIC SUCH AS INTERSECTIONS, TRAFFIC LIGHTS, AND ROAD SIGNS | MOVABLE OBJECTS SUCH AS VEHICLES, PEDESTRIANS, MOTORBIKES, AND BICYCLES |

FIG. 6

| COGNITIVE LOAD INFLUENTIAL FACTORS | LOAD VALUE GAIN ADJUSTMENTS (A_$\alpha$n) |
|---|---|
| OPERATION OF OBJECT | MOVEMENT SPEED IS HIGH OR LOW |
| LAMP OF OBJECT | ILLUMINATED OR NOT |
| DISTANCE BETWEEN VEHICLE AND OBJECT | FAR OR NEAR |

FIG. 7

| ENVIRONMENT LEVEL INFLUENTIAL FACTORS | ENVIRONMENT LEVEL CORRECTION VALUES (C) |
|---|---|
| DRIVER'S COGNITIVE FIELD-OF-VIEW AREA | LEVEL OF CONTRAST |
| ROUTE | DEGREE OF COMPLEXITY OF DRIVING PATH AHEAD |

VEHICLE DRIVE ASSIST APPARATUS

CROSS-REFERENCE TO RELATED APPLICATIONS

The present application claims priority from Japanese Patent Application No. 2023-118180 filed on Jul. 20, 2023, the entire contents of which are hereby incorporated by reference.

BACKGROUND

The disclosure relates to a vehicle drive assist apparatus for a vehicle, configured to warn a driver who drives the vehicle of a potential collision object such as another vehicle.

In recent years, advanced drive assist systems have expanded their detection ranges through increased and wider-angle in-vehicle sensors. Therefore, the advanced drive assist systems can detect objects that drivers easily overlook, such as vehicles approaching from sides, in addition to vehicles in front.

An example of lateral object detection functionality is disclosed in Japanese Unexamined Patent Application Publication (JP-A) No. 2012-234409. The techniques disclosed in JP-A No. 2012-234409 use a driver's line-of-sight detection system as well as a line-of-sight guidance device such as a head-up display (HUD). The techniques disclosed in JP-A No. 2012-234409, in response to detection of a collision hazard approaching from outside the driver's line-of-sight range, perform line-of-sight guidance in the direction of that object.

Moreover, in situations where obstacles are easily visible to the driver, an example of a precedent for making the driver not feel annoyed by warnings by refraining from issuing warnings is disclosed in JP-A No. 2013-171389. The techniques disclosed in JP-A No. 2013-171389 determine whether it is necessary to implement warnings by assuming the state in which the degree of match between a captured image and a target object template is greater than or equal to a reference value as a situation where the driver can easily perceive the target object.

SUMMARY

An aspect of the disclosure provides a vehicle drive assist apparatus for a vehicle. The vehicle drive assist apparatus includes a forward environment recognition device, a lateral environment recognition device, an alarm device, and a control unit. The forward environment recognition device is configured to acquire forward environment information of the vehicle. The lateral environment recognition device is configured to acquire lateral environment information of the vehicle. The alarm device is configured to alert a driver who drives the vehicle through at least an alarm or a warning display. The control unit is configured to receive surrounding environment information including the forward environment information and the lateral environment information and activate the alarm device. The control unit is configured to compute a cognitive load value of the driver based on an object detected within a cognitive field-of-view area of the driver extracted from the surrounding environment information, and, in accordance with the cognitive load value, variably set a warning level of the alarm device to be activated upon detection of a potential collision object in the lateral environment information.

An aspect of the disclosure provides a vehicle drive assist apparatus for a vehicle. The vehicle drive assist apparatus includes a forward environment recognition device, a lateral environment recognition device, an alarm device, and circuitry. The forward environment recognition device includes a camera or a sensor configured to acquire forward environment information of the vehicle. The lateral environment recognition device includes a camera or a sensor configured to acquire lateral environment information of the vehicle. The alarm device includes a monitor or a speaker configured to alert a driver who drives the vehicle through at least an alarm or a warning display. The circuitry is configured to receive surrounding environment information including the forward environment information and the lateral environment information and activate the alarm device. The circuitry is configured to compute a cognitive load value of the driver based on an object detected within a cognitive field-of-view area of the driver extracted from the surrounding environment information, and, in accordance with the cognitive load value, variably set a warning level of the alarm device to be activated upon detection of a potential collision object in the lateral environment information.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 5 is a table illustrating base reference load values for objects;

FIG. 6 is a table illustrating cognitive load influential factors and load value gain adjustments;

FIG. 7 is a table illustrating driving environment level influential factors and cognitive load level corrections.

DETAILED DESCRIPTION

Figure 1:
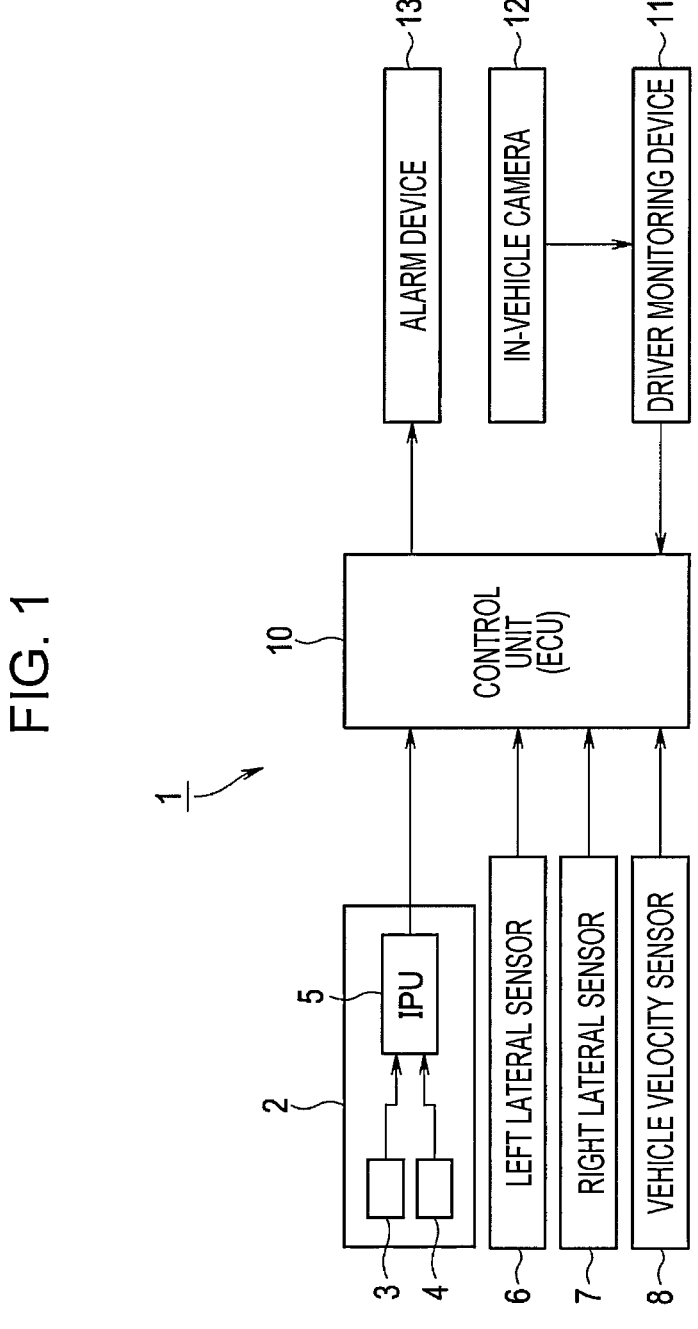
FIG. 1 is a block diagram illustrating the configuration of a vehicle drive assist apparatus for a vehicle.

With regard to the techniques disclosed in JP-A No. 2012-234409, there are cases where the driver's awareness recognizes a collision hazard based on the driver's peripheral vision, even if the driver's line of sight is not directed towards the direction of the collision hazard. In that case, the driver may find line-of-sight guidance by the line-of-sight guidance device annoying. In particular, in situations where lateral approaching objects appear frequently, line-of-sight guidance to the driver occurs also frequently, posing the issue of not being a convenient safety control.

In addition, the techniques disclosed in JP-A No. 2013-171389 regard the degree of match in template matching alone as the factor influencing situations where drivers easily overlook objects. Therefore, the techniques disclosed in JP-A No. 2013-171389 pose the issue of not being able to comprehensively assess the driver's psychological load state. Furthermore, with regard to the techniques disclosed in JP-A No. 2013-171389, even if the image's degree of template match is high, depending on the number, type, environmental state, etc. of objects within the driver's field of view, the driver may fall into a state where the driver easily overlooks obstacles.

Accordingly, it is desirable to provide a vehicle drive assist apparatus configured to determine situations where drivers may find it difficult or easy to recognize potential collision objects from sides and execute effective warnings.

An embodiment of one aspect of the disclosure will now be described in detail below with reference to the drawings. Note that, in the drawings used in the following description, each component is scaled differently to allow for easier recognition on the drawings, and the disclosure is not limited to the quantity of components depicted in these drawings, the shapes of the components, the ratio of the sizes of the components, and the relative positional relationship of the components. Note that the present embodiment will be described based on the assumption of left-hand traffic. Therefore, in the case of right-hand traffic, the description will be applied by replacing "left" with "right".

A vehicle drive assist apparatus 1 according to the present embodiment has a vehicle-mounted camera unit 2, a left lateral sensor 6, a right lateral sensor 7, a vehicle velocity sensor 8, a control unit (electronic control unit (ECU)) 10, a driver monitoring device 11, an in-vehicle camera 12, and an alarm device 13, as illustrated in FIG. 1.

The vehicle-mounted camera unit 2 is a forward environment recognition device configured to acquire forward environment information 25 of a vehicle 50 (see FIGS. 2 and 3), and has a stereo camera composed of a main camera 3 and a sub-camera 4. The vehicle-mounted camera unit 2 has an image processing unit (IPU) 5, which applies certain image processing on environment information, which includes images in front of the vehicle 50 acquired by the main camera 3 and the sub-camera 4. The image processing unit 5 outputs the forward environment information 25 including the forward driving environment image information (distance image information) acquired by applying certain image processing on the images in front of the vehicle 50 to the control unit 10.

The left lateral sensor 6 and the right lateral sensor 7 are lateral environment recognition devices configured to acquire lateral environment information 26 and 27 (see FIGS. 2 and 3) of the vehicle 50, and are provided in the vicinity of the front bumper or door mirrors. The left lateral sensor 6 and the right lateral sensor 7 acquire environment information over a relatively wide angle range extending from the left and right front and side to the rear areas outside the field of view of the aforementioned vehicle-mounted camera unit 2.

The left lateral sensor 6 and the right lateral sensor 7 are configured to monitor the areas diagonally forward to the left and right sides, as well as diagonally rearward, which are difficult to recognize in images from the vehicle-mounted camera unit 2, and output the acquired information to the control unit 10 as the lateral environment information 26 and 27 (see FIGS. 2 and 3), which are the left and right lateral driving environment information. Note that the left lateral environment information 26 acquired by the left lateral sensor 6 and the right lateral environment information 27 acquired by the right lateral sensor 7 are input to the control unit 10.

The left lateral sensor 6 and the right lateral sensor 7 are millimeter wave radars, microwave radars, ultrasonic sensors, ranging sensors such as LiDAR (Light Detection and Ranging), or lateral cameras. Note that the left lateral sensor 6 and the right lateral sensor 7 may be configured by combining ranging sensors with lateral cameras.

The vehicle-mounted camera unit 2, the left lateral sensor 6, and the right lateral sensor 7 may serve as a "surrounding environment information acquiring unit" of the present embodiment. That is, the forward environment information 25 and the two pieces of lateral environment information 26 and 27 may correspond to "surrounding environment information" of the present embodiment.

The control unit 10 recognizes stereoscopic objects, obstacles, etc. from the surrounding environment information input from the vehicle-mounted camera unit 2, the left lateral sensor 6, and the right lateral sensor 7. The control unit 10 performs, for example, recognition of the type of stereoscopic object, the distance to the stereoscopic object, the velocity of the stereoscopic object, the relative velocity with the stereoscopic object, and so forth.

Objects such as stereoscopic objects, obstacles, etc. recognized in this way based on the detection of the vehicle-mounted camera unit 2, the left lateral sensor 6, and the right lateral sensor 7 may be referred to as "objects" in the following description.

The vehicle velocity sensor 8 is a vehicle velocity detection unit configured to detect the velocity of the vehicle 50. The vehicle velocity sensor 8 outputs the detected vehicle velocity to the control unit 10.

The driver monitoring device 11 is connected to the in-vehicle camera 12, which is an imaging unit. The driver monitoring device 11 and the in-vehicle camera 12 constitute a driver monitoring system (DMS). The in-vehicle camera 12 is disposed, for example, on a dashboard in a vehicle compartment (cabin) which is not illustrated. Note that the in-vehicle camera 12 may be installed in any location within the vehicle compartment as long as it is disposed at a suitable position to capture a driver (see FIG. 4, hereinafter referred to as a driver 200) seated in the driver's seat and driving the vehicle 50.

The alarm device 13 notifies (warns) the driver 200 when it detects an object (obstacle), such as a lateral vehicle 103 approaching or temporarily stopped outside the range of a driver's cognitive field-of-view area 30 (see FIGS. 2 and 3) extracted by the control unit 10, and alerts the driver 200. Note that the alarm device 13 is composed of a monitor, a speaker, and the like. The alarm device 13 notifies the driver 200 through text, images, sound, etc.

That is, the alarm device 13 reports warning information through audible alerts from the speaker, as well as visual warnings on the meter area of the instrument panel, navigation system monitor, etc. (none of which is illustrated).

The control unit 10 is composed of a microcomputer including a central processing unit (CPU), read-only memory (ROM), random-access memory (RAM), and non-volatile storage. The ROM stores control programs, fixed data, and the like for realizing operations set for each system.

The control unit 10 monitors the surrounding environment information acquired from the vehicle-mounted camera unit 2, the left lateral sensor 6, and the right lateral sensor 7.

The driver's cognitive field-of-view area 30 of the present embodiment will now be described. The driver's cognitive field-of-view area 30 is acquired by the control unit 10 through extraction of an elliptical area indicated by dashed line in FIGS. 2 to 4 from the surrounding environment information. The driver's cognitive field-of-view area 30 represents the effective field-of-view range that can be visually attended by the driver 200 based on his/her visual characteristics.

Figure 4:
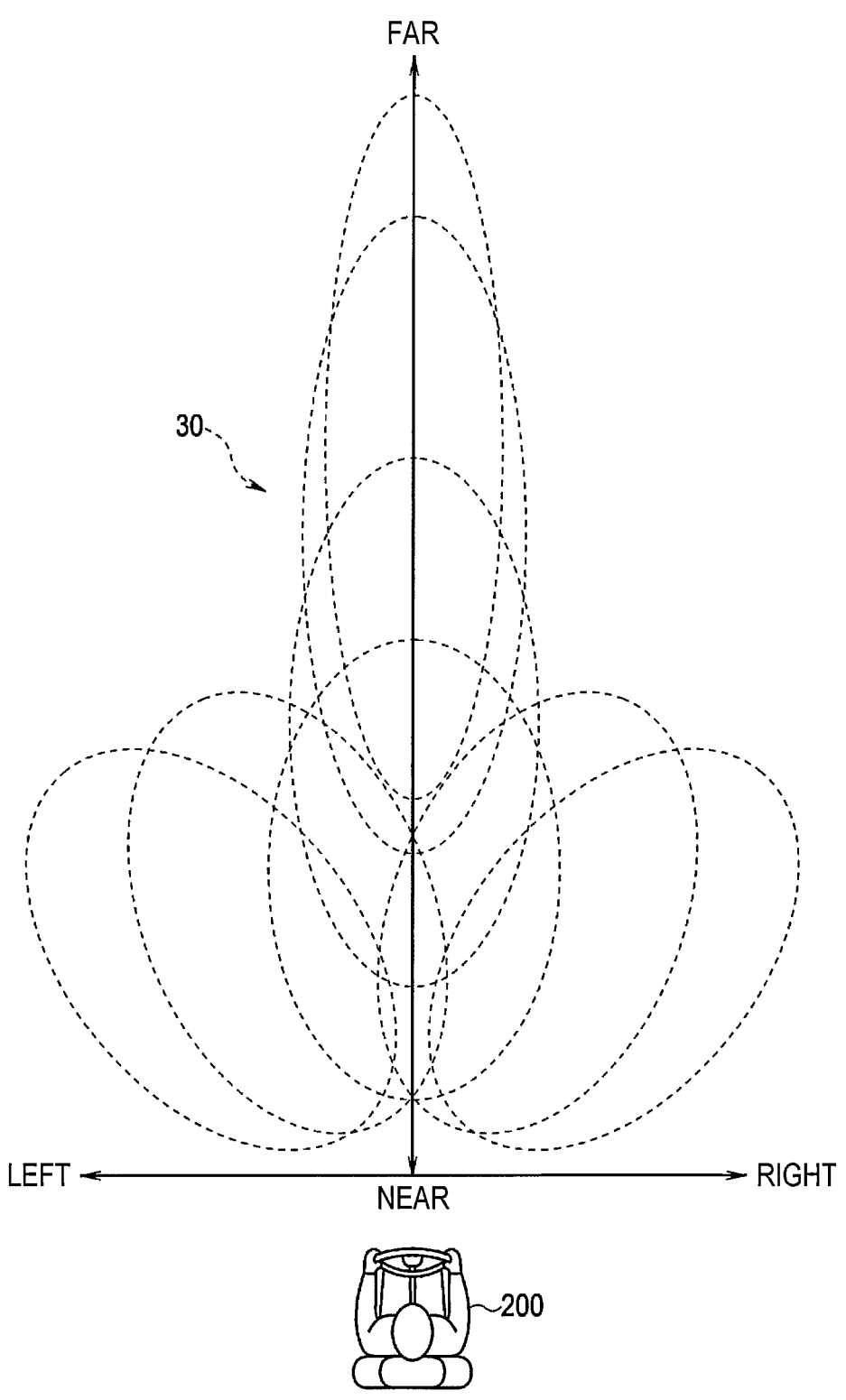
FIG. 4 is a diagram illustrating the driver's cognitive field-of-view area, which varies depending on the vehicle velocity and the driver's line-of-sight direction.

The control unit 10 changes the setting range of the driver's cognitive field-of-view area 30 from the forward direction to the lateral direction in accordance with the gaze direction based on the line-of-sight direction of the driver 200 detected by the driver monitoring system (DMS), as illustrated in FIG. 4.

In addition, the control unit 10 changes the setting range of the driver's cognitive field-of-view area 30 in terms of perspective, front-to-back length, and left-to-right width in accordance with the velocity of the vehicle 50 detected by the vehicle velocity sensor 8. The control unit 10 sets the driver's cognitive field-of-view area 30 to extend further into the perspective and elongate its length in the longitudinal direction while narrowing its width in the lateral direction as the velocity of the vehicle 50 increases. The control unit 10 also sets the driver's cognitive field-of-view area 30 to be closer to the vehicle 50 while shortening its length in the longitudinal direction and widening its width in the lateral direction as the velocity of the vehicle 50 decreases.

The driver's cognitive field-of-view area 30 set by the control unit 10 as described above is used in detecting the cognitive load on the driver 200. The cognitive load mentioned here is an indicator of the load on the cognitive ability of the driver 200 according to the amount of information that the human brain is constantly processing.

Figure 2:
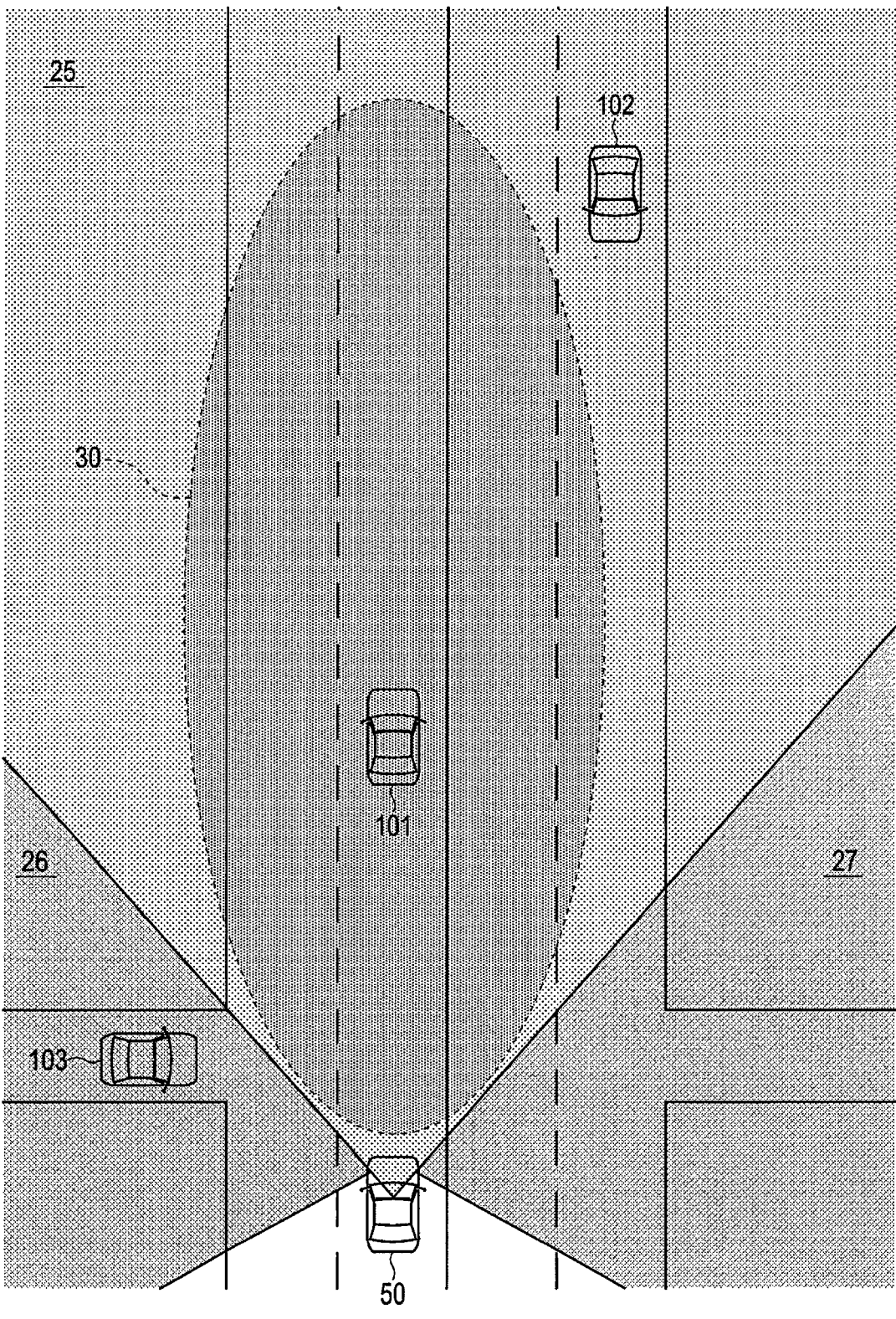
FIG. 2 is a diagram illustrating the surrounding environment information of the vehicle and the driver's cognitive field-of-view area, depicting a state with few other vehicles, etc.

For example, in FIG. 2, a single preceding vehicle 101 alone is included in the driver's cognitive field-of-view area 30 of the driver 200 who is driving the vehicle 50. As such, the driver 200 carefully observes and recognizes the single preceding vehicle 101 alone. Therefore, the driver 200 is in a state where the amount of information processed by the brain is small and the cognitive load is low.

Additionally, objects such as an oncoming vehicle 102 and the lateral vehicle 103 approaching from the side road or temporarily stopped on the side road are included in the peripheral field of view outside the range of the driver's cognitive field-of-view area 30. In this case, since the driver 200 is in a state of low cognitive load, it is unlikely to overlook objects such as the oncoming vehicle 102 and the lateral vehicle 103 in the peripheral field of view, making them easy to recognize. That is, it is easy for the driver 200 to perceive objects outside the range of the driver's cognitive field-of-view area 30.

Figure 3:
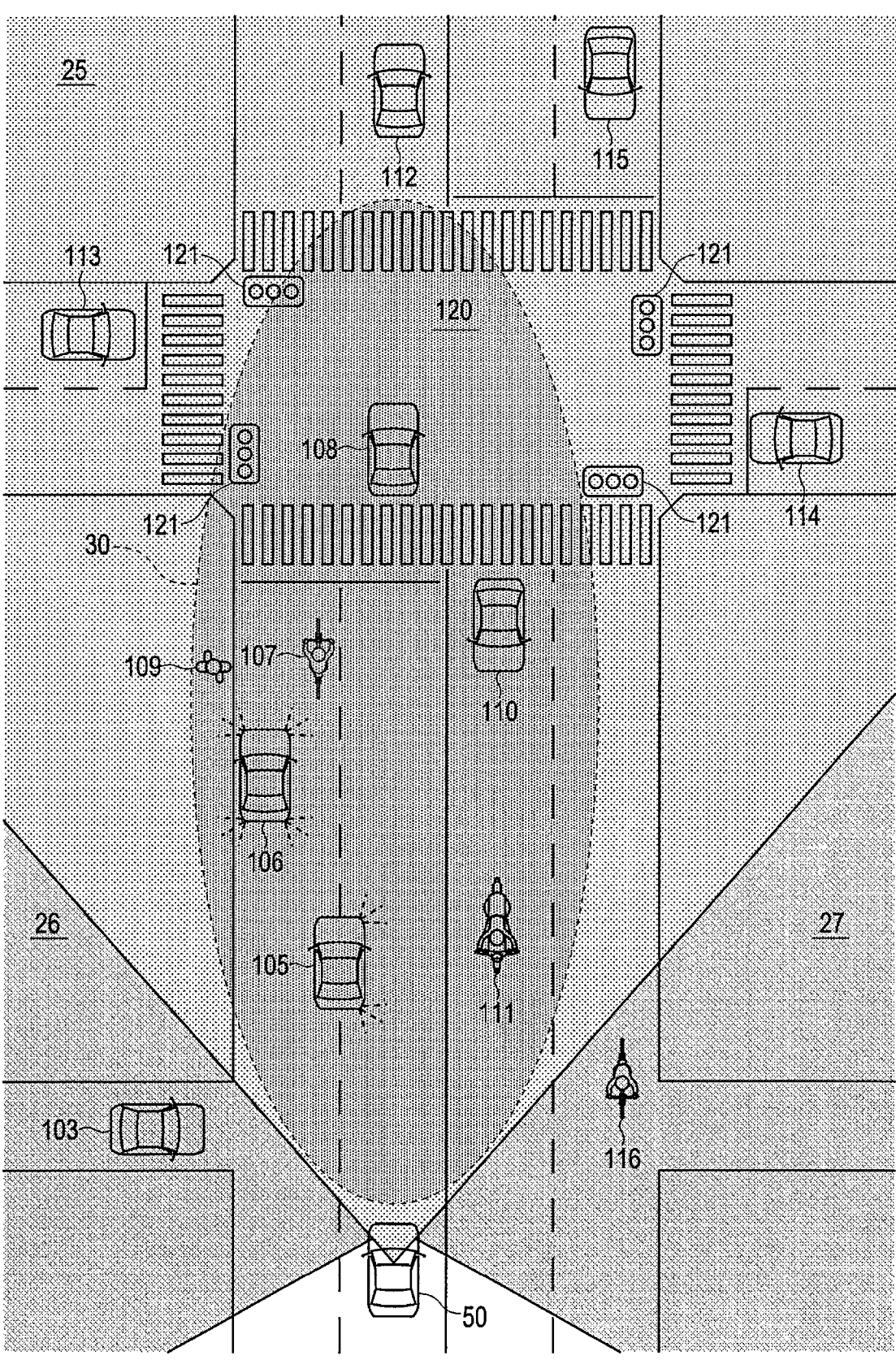
FIG. 3 is a diagram illustrating the surrounding environment information of the vehicle and the driver's cognitive field-of-view area, depicting a state with many other vehicles, etc.

In contrast, for example, in FIG. 3, the driver's cognitive field-of-view area 30 of the driver 200 includes a lane-changing vehicle 105, a parked vehicle 106, a bicycle 107, a preceding vehicle 108, a pedestrian 109, an oncoming vehicle 110, an oncoming motorbike 111, an intersection 120, and traffic lights 121. As such, it is necessary for the driver 200 to visually attend to multiple objects, such as the vehicles (105, 106, 108, and 110), the bicycle 107, the pedestrian 109, the oncoming motorbike 111, the intersection 120, and the traffic lights 121. Therefore, the driver 200 is in a state where the amount of information processed by the brain is very large and the cognitive load is high.

Additionally, the peripheral field of view other than the driver's cognitive field-of-view area 30 includes objects such as the lateral vehicle 103 approaching from the side road or temporarily stopped on the side road, as well as a preceding vehicle 112 having passed through the intersection 120, signal waiting vehicles 113 and 114 on the side roads of the intersection 120, an oncoming vehicle 115 farther away from the intersection 120, a bicycle 116 traveling in the oncoming lane, etc. In this case, the driver 200 is in a state where the amount of information processed by the brain is high and the cognitive load is high.

Therefore, the driver 200 easily overlooks objects such as the vehicles (103, 112, 113, 114, and 115) and the bicycle 116 in the peripheral field of view, making them difficult to recognize. That is, it is difficult for the driver 200 to perceive objects outside the range of the driver's cognitive field-of-view area 30.

By the way, the vehicle drive assist apparatus 1 according to the present embodiment is configured to detect the amount of information (objects) within the driver's cognitive field-of-view area 30 and execute effective warning control according to the low cognitive load state and the high cognitive load state of the driver 200.

In the vehicle drive assist apparatus 1, the control unit 10 computes a driver's cognitive load value D that quantifies the level of cognitive load on the driver 200 based on vehicle-exterior information based on acquisition of objects such as stereoscopic objects, obstacles, etc. included in the driver's cognitive field-of-view area 30 detected by the vehicle-mounted camera unit 2, the left lateral sensor 6, and the right lateral sensor 7. Based on the computed driver's cognitive load value D, the control unit 10 of the vehicle drive assist apparatus 1 conducts an oversight determination of the surrounding environment that is outside the range of the driver's cognitive field-of-view area 30.

The control unit 10 determines the final driver's cognitive load value D by adding a cognitive load gain (A_αn) for gain adjustment according to the state of each object to a base load value (A_n) for the category type of that object, and then multiplying it by a correction value C for the driving environment level.

In the computation of the driver's cognitive load value D, the control unit 10 reads from a map where the base load value (A_n) for the relevant category type, the cognitive load gain (A_αn) corresponding to the state of the object, and the correction value C for the driving environment level are set.

Note that the control unit 10 may be configured to read the values of conditions selected by artificial intelligence (AI) for the base load value (A_n) for the category type, the cognitive load gain (A_αn) corresponding to the state of the object, and the correction value C for the driving environment level.

For example, as illustrated in FIG. 5, static objects such as those whose object category types are signs and the like are set with a small value (A_1) for the base load value (A_n). Also, static objects related to road traffic such as those whose object category types are the intersection 120, traffic lights 121, and road signs are set with a moderate value (A_2) for the base load value (A_n). Then, movable objects such as those whose object category types are the vehicles (103, 112, 113, 114, and 115), pedestrian 109, motorbike 111, and bicycle 116 are set with a large value (A_3) for the basic value (A_n).

Additionally, the control unit 10 computes load value gain adjustments for factors that affect the base load value (A_n) of the driver 200 due to each object. For example, as illustrated in FIG. 6, the values of load value gain adjustments (A_α) are set according to whether the movement speed of the operation of the object serving as a cognitive load influential factor is high or low, and, when the object is a vehicle or the like, whether lamps such as turn signals and/or brakes are illuminated, and whether the distance between the vehicle 50 and the object is far or near.

That is, the higher (faster) the movement speed of the operation of the object serving as a cognitive load influential factor, the more the control unit 10 adds a certain cognitive load gain (A_$\alpha$1) as a load value gain adjustment. Moreover, in the case where the object serving as a cognitive load influential factor is a vehicle or the like, if lamps such as turn signals and/or brakes are illuminated, the control unit 10 adds a certain cognitive load gain (A_$\alpha$2) as a load value gain adjustment. Furthermore, the shorter the distance between the vehicle 50 and the object serving as a cognitive load influential factor, the more the control unit 10 adds a certain cognitive load gain (A_$\alpha$3) as a load value gain adjustment.

In this way, the control unit 10 computes the object load value (A_t) by adding the cognitive load gain (A_$\alpha$n) to the base load value (A_n) for each object. Then, the control unit 10 computes a reference load value B, which represents the sum of the object load values (A_t) of all the objects included in the driver's cognitive field-of-view area 30 {B=$\Sigma$(A_t)}.

Next, the control unit 10 computes the final driver's cognitive load value D by multiplying the reference load value B by the correction value C for the driving environment level (D=B×C). Note that, as illustrated in FIG. 7, the control unit 10 determines the correction value C for the driving environment level according to the level of contrast of images within the driver's cognitive field-of-view area 30, the complexity of the driving path ahead, and the like.

For example, the magnitude of the correction value C for the driving environment level is set depending on the level of contrast of images within the driver's cognitive field-of-view area 30 due to the influence of road environment factors such as night time, backlight, sunlight, or streetlamp illumination. Specifically, when the contrast of the image is low, a large correction value C is set for the driving environment level, and when the contrast of the image is high, a small correction value C is set for the driving environment level.

Also, the magnitude of the correction value C for the driving environment level is set depending on the complexity of the route, such as whether the driving path ahead is a straight road, intersection, multi-intersection, curve, or the like. Specifically, in the case of a complex driving path ahead such as an intersection, multi-intersection, branching road, or the like, a large correction value C is set for the driving environment level, and, in the case of a clear straight road ahead with good visibility, a small correction value C is set for the driving environment level.

Figure 8:
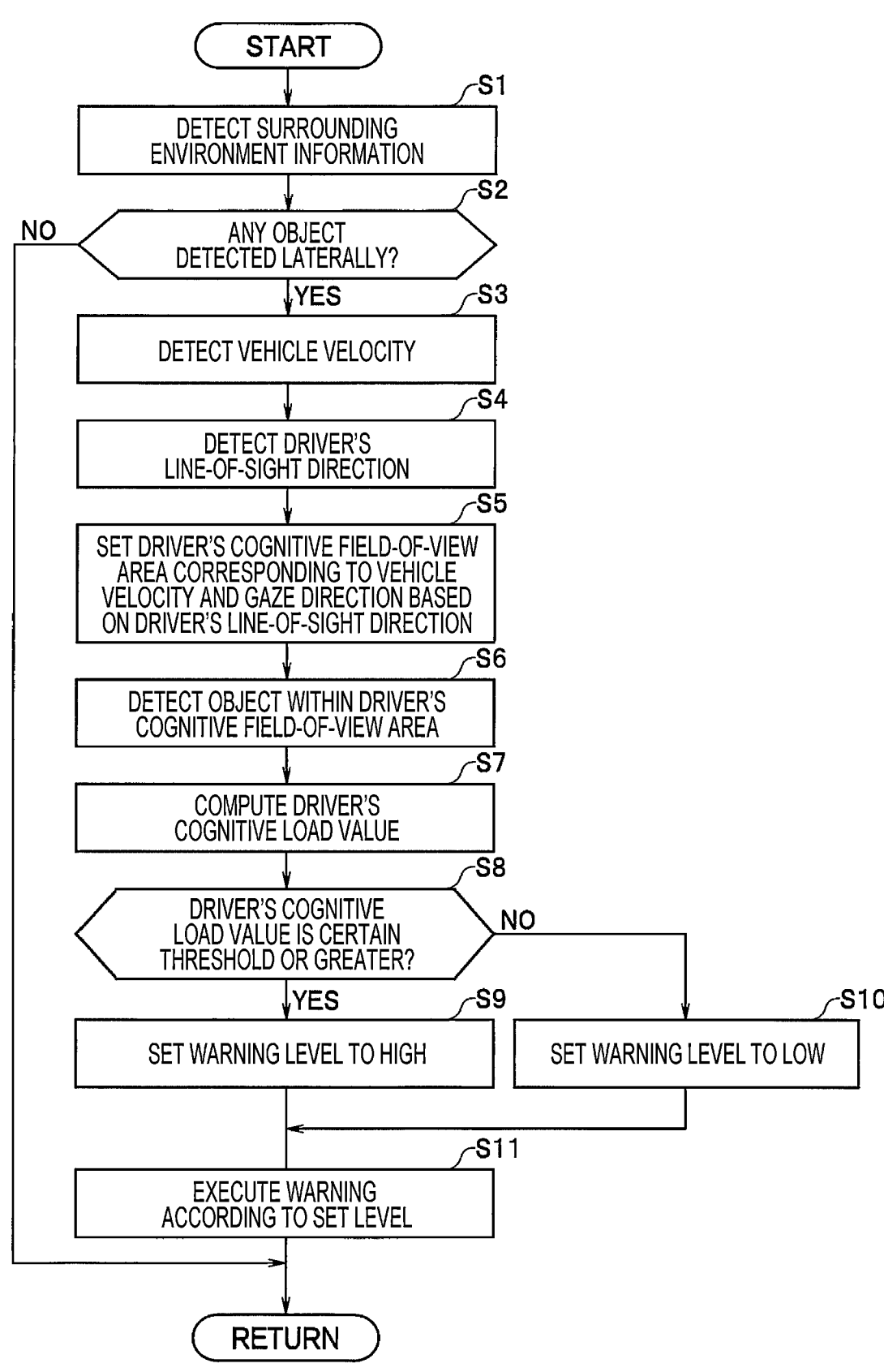
FIG. 8 is a flowchart illustrating an example of control executed by a control unit.

Now, based on the flowchart illustrated in FIG. 8, an example of control executed by the control unit 10 of the vehicle drive assist apparatus 1 configured as described above will be described below.

First, the control unit 10 acquires surrounding environment information (S1). The control unit 10 acquires surrounding environment information including the forward environment information 25 output from the vehicle-mounted camera unit 6, the left lateral environment information 26 output from the left lateral sensor 6, and the right lateral environment information 27 output from the right lateral sensor 7.

The control unit 10 determines whether an object has been detected laterally (S2). The control unit 10 determines whether an object, such as the lateral vehicle 103 approaching from the side road or temporarily stopped on the side road, has been detected in the left/right lateral environment information including the left lateral environment information 26 and right lateral environment information 27. Note that, since left-hand traffic is discussed here, the control unit 10 may simply determine whether an object has been detected in the lateral environment information which is namely the left lateral environment information 26.

If no object, such as the lateral vehicle 103, has been detected in the left/right lateral environment information (step S2: NO), the control unit 10 returns to the determination routine in step S1 and executes the subsequent processing again.

If an object such as the lateral vehicle 103 has been detected in the left/right lateral environment information (step S2: YES), the control unit 10 detects the velocity of the vehicle 50 (S3). The control unit 10 detects the velocity of the vehicle 50 input from the vehicle velocity sensor 8.

The control unit 10 detects the line-of-sight direction of the driver 200 (S4). The control unit 10 detects the line-of-sight direction of the driver 200 input from the driver monitoring system (DMS).

The control unit 10 sets the driver's cognitive field-of-view area 30 based on the detected velocity of the vehicle 50 and the line-of-sight direction of the driver 200 (S5). The control unit 10 changes the perspective, front-to-back length, and left-to-right width based on the velocity of the vehicle 50 detected by the vehicle velocity sensor 8, as well as sets the driver's cognitive field-of-view area 30 in a direction according to the gaze direction based on the line-of-sight direction of the driver 200.

The control unit 10 detects an object within the driver's cognitive field-of-view area 30 (S6). The control unit 10 detects an object such as a vehicle within the driver's cognitive field-of-view area 30 set in step S5.

The control unit 10 computes the driver's cognitive load value D (S7). The control unit 10 computes the base load value (A_n) for each object within the driver's cognitive field-of-view area 30.

Next, the control unit 10 adds the certain cognitive load gain (A_$\alpha$n) to factors that affect the computed cognitive load value (A_n) of each object. The control unit 10 then computes the reference load value B, which represents the sum of the object load values (A_t) of objects included in the driver's cognitive field-of-view area 30. Finally, the control unit 10 computes the final driver's cognitive load value D by multiplying the reference load value B by the correction value C for the driving environment level.

The control unit 10 determines whether the driver's cognitive load value D is greater than or equal to a certain threshold Dth (S8). The control unit 10 determines whether the computed final driver's cognitive load value D in the driver's cognitive field-of-view area 30 is greater than or equal to the certain threshold Dth.

Note the certain threshold Dth is set in advance to the value of the driver's cognitive load value D in situations where it is difficult for the driver 200 to recognize (perceive) objects in the peripheral field of view outside the range of the driver's cognitive field-of-view area 30. The set value of the certain threshold Dth can be changed accordingly.

If the driver's cognitive load value D is greater than or equal to the certain threshold Dth (step S8: YES), the control unit 10 sets the warning level to high (S9). In contrast, if the driver's cognitive load value D is less than the certain threshold Dth (step S8: NO), the control unit 10 sets the warning level to low (S10). The control unit 10 then executes a warning according to the set level (S11).

Note that the control unit 10 determines that when the warning level is set to high, the driver's cognitive load value D is high, indicating a situation where it is difficult for the driver 200 to recognize objects in the peripheral field of view, and the driver 200 is likely to overlook them. That is, the control unit 10 determines that the driver 200 is in a state where it is difficult for the driver 200 to easily perceive objects and the like in the peripheral field of view.

Therefore, when the control unit 10, based on the left/right lateral environment information including the left lateral environment information 26 and the right lateral environment information 27, detects an object such as the lateral vehicle 103 approaching from the side road or temporarily stopped on the side road, the control unit 10 raises the level of the alarm device 13, such as an alarm and/or a warning display, and activates the alarm device 13.

That is, when the driver's cognitive load value D is high, the vehicle drive assist apparatus 1 executes a warning activation that increases the volume of the alarm sound and/or enlarges the warning display of the alarm device 13 so that the driver 200 can easily recognize that there is an object serving as a potential lateral collision object, like the lateral vehicle 103 approaching from the side road or temporarily stopped on the side road.

In addition, when the warning level is set to low, the control unit 10 determines that the driver's cognitive load value D is low, indicating a situation where it is easy for the driver 200 to recognize objects and the like in the peripheral field of view, and the likelihood of oversight is low. That is, the control unit 10 determines that the driver 200 is in a state where it is easy to perceive objects and the like in the peripheral field of view.

Therefore, even when the control unit 10, based on the left/right lateral environment information including the left lateral environment information 26 and the right lateral environment information 27, detects an object such as the lateral vehicle 103 approaching from the side road or temporarily stopped on the side road, the control unit 10 executes a warning activation that lowers the warning level of the alarm device 13, such as an alarm and/or a warning display.

That is, when the driver's cognitive load value D is low, the vehicle drive assist apparatus 1 executes a warning with a reduced volume or does not perform a warning display even if there is an object serving as a potential lateral collision object, like the lateral vehicle 103 approaching from the side road or temporarily stopped on the side road. Note that the vehicle drive assist apparatus 1 may, when the control unit 10 determines that the driver's cognitive load value D is high but sets the warning level to low, refrain from activating the alarm device 13 or issuing any alarms or warning displays, even if there is a lateral collision hazard.

As described above, the vehicle drive assist apparatus 1, based on the driver's cognitive load value D of the driver 200, varies the level of warning activation for a potential lateral collision object (obstacle), such as the lateral vehicle 103 approaching from the side road or temporarily stopped on the side road. This allows the vehicle drive assist apparatus 1 to execute an effective warning for the driver 200.

As a result, the vehicle drive assist apparatus 1 can lower the warning level or refrain from issuing warnings through the alarm device 13 in situations where it is easy for the driver 200 to recognize (difficult to overlook) potential lateral collision objects in the peripheral field of view, thus making the driver 200 less annoyed by alarms or the like from the alarm device 13.

As described above, the vehicle drive assist apparatus 1 of the present embodiment is configured to determine situations where drivers may find it difficult or easy to recognize potential collision objects from sides and execute effective warnings.

Note that, under conditions where the driver's cognitive load D is high due to high-speed driving, etc., the area in the lateral direction of the driver's cognitive field-of-view area 30 becomes narrower. Thus, it may be permissible to expand the range for detecting obstacles from the sides (potential lateral collision objects) to be targeted for warning. That is, it may be permissible to expand the area of left/right lateral environment information detected based on the left lateral environmental information 26 and the right lateral environmental information 27.

Also, the breadth of the field of view of the driver 200 varies among individuals or depending on factors such as age. Therefore, it may be permissible to appropriately modify parameters such as the driver's cognitive field-of-view area 30, which is used in computing the driver's cognitive load value D, as well as the certain threshold Dth, based on individualized settings, learning, etc. for each driver 200.

Furthermore, it is desirable to use the field of view of the driver 200 as the driver's cognitive field-of-view area 30, which is used in computing the driver's cognitive load value D. Note that, if the line-of-sight direction of the driver 200 is undetectable by the driver monitoring system (DMS), the control unit 10 sets the driver's cognitive field-of-view area 30 in the target area, assuming that the driver 200 is focusing on the center front, by extracting it from the surrounding environment information.

Note that the control unit 10 has a processor including a central processing unit (CPU) and a storage device such as ROM, RAM, etc. Also, all or part of the configuration of multiple circuits in the processor may be executed using software. For example, it may be permissible for the CPU to read and execute various programs corresponding to the functions stored in the ROM.

Furthermore, all or part of the functions of the processor may be configured using logic circuits or analog circuits, and processing of various programs may be realized using electronic circuits such as field-programmable gate arrays (FPGAs).

The disclosure described in the above embodiment is not limited to the embodiment, and various modifications can be implemented within the scope without departing from its spirit at the implementation stage. Furthermore, the above-described embodiment includes techniques of the disclosure at various stages, and various techniques of the disclosure can be extracted by appropriately combining multiple components disclosed.

For example, if several components are removed from all the components discussed in the embodiment, and the stated issues can still be solved and the stated effects can still be achieved, then the configuration without these removed components may be extracted as techniques of the disclosure.

According to the disclosure, it is possible to provide a vehicle drive assist apparatus configured to determine situations where drivers may find it difficult or easy to recognize potential collision objects from the sides and execute effective warnings.

The control unit 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle drive assist apparatus for a vehicle, the vehicle drive assist apparatus comprising:

a forward environment recognition device configured to acquire forward environment information of the vehicle;

a lateral environment recognition device configured to acquire lateral environment information of the vehicle;

an alarm device configured to alert a driver who drives the vehicle through at least an alarm or a warning display; and a control unit configured to receive surrounding environment information including the forward environment information and the lateral environment information and activate the alarm device, wherein the control unit is configured to compute a cognitive load value of the driver based on an object detected within a cognitive field-of-view area of the driver extracted from the surrounding environment information, and, in accordance with the cognitive load value, variably set a warning level of the alarm device to be activated upon detection of a potential collision object in the lateral environment information.

2. The vehicle drive assist apparatus according to claim 1, wherein the control unit is further configured to determine whether the cognitive load value is greater than or equal to a threshold corresponding to a state in which it is difficult for the driver to recognize objects in a peripheral field-of-view area outside the cognitive field-of-view area, and, based on a result of the determination, set the warning level for activation of the alarm device upon detection, in the lateral environment information, of a potential collision object located in the peripheral field-of-view area outside the cognitive field-of-view area.

3. The vehicle drive assist apparatus according to claim 2, wherein the control unit is further configured, in accordance with the cognitive load value, to variably set a region of the lateral environment information serving as a target region for detection of the potential collision object such that, when the cognitive load value is high, the region of the lateral environment information is expanded and, when the cognitive load value is low, the region of the lateral environment information is reduced.

4. A vehicle drive assist apparatus for a vehicle, the vehicle drive assist apparatus comprising:

a forward environment recognition device configured to acquire forward environment information of the vehicle;

a lateral environment recognition device configured to acquire lateral environment information of the vehicle;

an alarm device configured to alert a driver who drives the vehicle through at least an alarm or a warning display; and a control unit configured to receive surrounding environment information including the forward environment information and the lateral environment information and activate the alarm device, wherein the control unit is configured to compute a cognitive load value of the driver based on an object detected within a cognitive field-of-view area of the driver extracted from the surrounding environment information, and, in accordance with the cognitive load value, variably set a warning level of the alarm device to be activated upon detection of a potential collision object in the lateral environment information, and wherein the control unit is further configured to compute the cognitive load value using a base load value of each object detected within the cognitive field-of-view area of the driver, a gain adjustment based on a cognitive load influential factor that influences the base load value, and a correction of a reference load value according to a driving environment.

5. The vehicle drive assist apparatus according to claim 4, further comprising:

a vehicle velocity sensor configured to detect a vehicle velocity of the vehicle; and a vehicle-mounted camera unit configured to detect a line-of-sight direction of the driver, wherein the control unit is configured to receive the vehicle velocity and the line-of-sight direction, and extract, from the surrounding environment information, the cognitive field-of-view area in accordance with the vehicle velocity and the line-of-sight direction.

6. The vehicle drive assist apparatus according to claim 5, wherein the control unit is configured to when the warning level is set to high, activate the alarm device to increase a volume of the alarm device and enlarge the warning display, and when the warning level is set to low, either activate the alarm device, without performing the warning display, reduce the volume of the alarm device compared to when the warning level is set to high, or refrain from activating the alarm device.

7. A vehicle drive assist apparatus for a vehicle, the vehicle drive assist apparatus comprising:

a forward environment recognition device including a camera or a sensor configured to acquire forward environment information of the vehicle;

a lateral environment recognition device including a camera or a sensor configured to acquire lateral environment information of the vehicle;

an alarm device including a monitor or a speaker configured to alert a driver who drives the vehicle through at least an alarm or a warning display; and circuitry configured to receive surrounding environment information including the forward environment information and the lateral environment information and activate the alarm device, wherein the circuitry is configured to compute a cognitive load value of the driver based on an object detected within a cognitive field-of-view area of the driver extracted from the surrounding environment information, and, in accordance with the cognitive load value, variably set a warning level of the alarm device to be activated upon detection of a potential collision object in the lateral environment information.

* * * * *